2,772,546
FLEXIBLE DRIVE

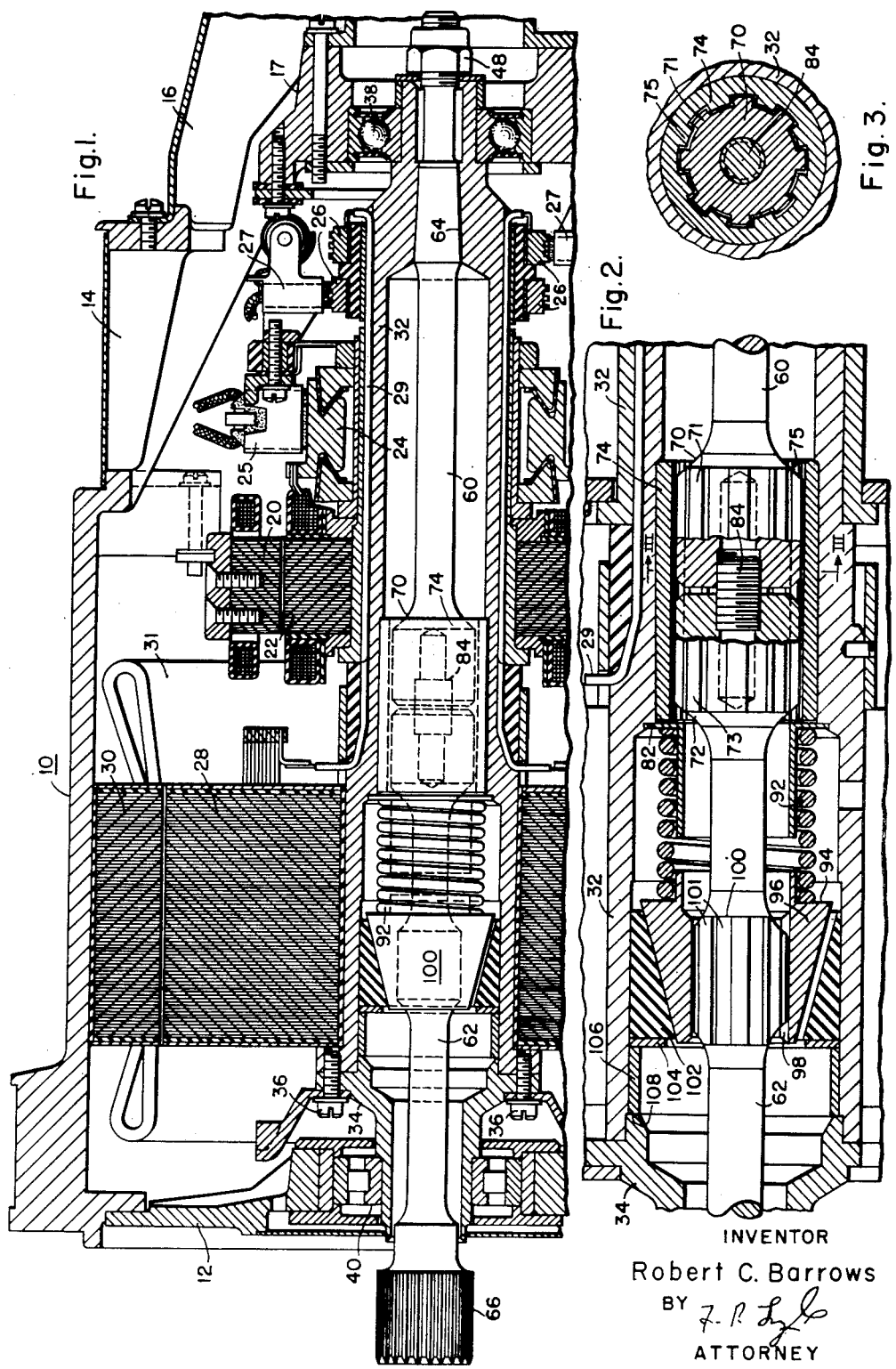
Dec. 4, 1956   R. C. BARROWS   2,772,546
FLEXIBLE DRIVE
Filed Aug. 17, 1955
INVENTOR
Robert C. Barrows
BY
ATTORNEY United States Patent Office 2,772,546
Patented Dec. 4, 1956

Robert C. Barrows, Lima, Ohio, assignor to Westinghouse Electric Corporation, East Pittsburgh, Pa., a corporation of Pennsylvania Application August 17, 1955, Serial No. 529,009

6 Claims. (Cl. 64—1)

The present invention relates to flexible drive means and, more particularly, to a flexible drive or coupling for transmitting power to a driven shaft and for absorbing or reducing torsional vibration.

The flexible drive means of the present invention is particularly suitable for use with dynamo-electric machines intended to be mounted on and driven by an internal combustion engine, such as aircraft generators, although it will be obvious that its usefulness is not limited to this specific application, and that it may be used for driving any device where similar vibration problems are encountered.

Aircraft generators, which supply the electrical loads on airplanes, are usually mounted directly on a main engine of the airplane and driven by a power take-off shaft geared to the engine crankshaft. Thus, if the generator shaft were rigidly connected to the driving shaft, the generator would be subject to severe torsional vibration because of the pulsating torque of an internal combustion engine. This torsional vibration may have a considerable amplitude over a relatively wide range of frequencies, and if the generator were rigidly connected to the drive shaft, it would obviously be subject to severe vibratory stresses resulting from the torsional vibration. For this reason, it is necessary to provide a flexible drive means or coupling between the engine and the generator to absorb or materially reduce the torsional vibration. It is also necessary for the flexible drive to prevent any substantial amplification of the vibration by resonant effects between any frequency of the applied vibration and any natural frequency of the generator or of the drive.

It has been suggested to use a spline connection at the end of a long torsionally resilient driving member with a large angular clearance between the mating members of the spline connection in order to reduce the torsional vibration and prevent any amplification of the applied vibration due to resonant frequency effects. While this solution provides a flexible drive or coupling, it has several disadvantages in that the long torsional member is difficult and expensive to manufacture, thus increasing the cost of the finished drive. Also, considerable wear inevitably occurs as a result of the impact loading on the spline connection due to the large angular clearance which is provided.

The present invention solves the above difficulties by dividing the long torsional driving member into two short sections which are relatively simple and inexpensive to manufacture. The adjacent ends of the two short members are connected by means of a spline connection consisting of a tubular member having internal splines which bridges the adjacent ends of the short members which have external splines. The spline connection has some angular clearance between the cooperating members of the spline connection. Since the total angular clearance required can be divided between the two adjacent ends, only half of the angular clearance need be provided in each end, thus allowing considerably stronger splines to be formed on the ends of the torsional members. This greatly reduces the wear in the spline connection which reduces the cost of operation of the flexible drive means.

Accordingly, the principal object of the present invention is to provide an improved flexible drive means for transmitting power to a driven shaft and for absorbing or reducing torsional vibration transmitted to the driven shaft, and which is relatively simple and inexpensive to manufacture and maintain.

A more specific object of the invention is to provide a novel, flexible drive means which includes a two-piece torsionally resilient driving member or spindle extending through a hollow driven shaft with the adjacent ends of the spindles being connected by means of a spline joint having angular clearance between the mating members of the spline connection. The opposite ends of the two spindles in turn are rigidly connected to the driven shaft and the driving means, respectively, and the flexible drive means also preferably includes friction damping means to oppose relative angular movement between the two spindles and the driven shaft.

These and other objects and advantages of the invention will be more fully understood from the following detailed description, taken in connection with the accompanying drawings, in which:

Fig. 1 is a partial longitudinal section of the flexible drive as applied to an aircraft generator;

Fig. 2 is a longitudinal sectional view on an enlarged scale of the flexible drive means; and Fig. 3 is a sectional view taken along line III—III of Fig. 2 showing the angular clearance between the mating members of the spline connection.

The invention, as shown in Fig. 1, is applied to an aircraft generator of the alternating-current type of more or less standard construction. The generator includes a generally cylindrical frame 10 with an end bracket 12 attached to one end by any desired means, such as bolts (not shown). A second end bracket 17 is supported from the opposite end of the frame member 10 by means of a plurality of circumferentially spaced webs 14 and 16. The cylindrical frame member 10 is attached directly to the aircraft engine at the end adjacent the end bracket 12 by any desired means (not shown). A laminated stator core 30 having a stator winding 31 is mounted in the cylindrical frame 10 and a generator rotor 28, shown as a field member, is mounted on one end of a hollow shaft 32. Also mounted in the cylindrical frame 10 is a field structure 20 for a direct-current exciter, and the exciter armature 22 is also mounted on the hollow shaft 32. The exciter armature 22 has a suitable commutator assembly 24, also mounted on the hollow shaft 32. Brushes 25 engage the commutator 24, and are connected to a second set of brushes 27 riding on slip rings 26. The slip rings 26 are connected to field windings on the rotor 28 by means of leads 29. An alternator with integral exciter has been shown for the purpose of illustration, but it will be obvious that the invention may be applied to any type of dynamoelectric machine.

The end of the hollow shaft 32 adjacent the slip-ring assembly 26 is rotatably mounted in the second end bracket 17 by means of a ball bearing 38. The opposite end of the hollow shaft 32 is provided with a hollow extension member 34 which is attached to the end of the hollow shaft 32 by means of a plurality of circumferentially spaced cap screws 36. The hollow extension member 34 is rotatably mounted in the end bracket 12 by means of a roller bearing 40.

In use, aircraft generators of this type are mounted on a main engine of the airplane by any desired means and driven by a drive shaft in the engine which is geared to the engine crankshaft. As pointed out above, the torsional vibration resulting from the pulsating torque of an internal combustion engine must be absorbed or reduced by a flexible driving connection between the engine drive shaft and the hollow shaft 32 of the generator. The flexible driving means of the present invention includes a torsionally resilient driving member which preferably consists of two short cylindrical spindles 60 and 62, which are axially aligned and extend longitudinally through the hollow shaft 32. The two short spindles 60 and 62 are designed to have sufficient torsional resiliency to absorb the vibration induced by the pulsating torque of the aircraft engine. The spindle 62 is provided with a spline connection 66 at one end for cooperation with a corresponding spline connection on the drive shaft in the engine (not shown), to effect a driving connection between the engine drive shaft and the spindle 62. The end of the short spindle 60 adjacent the slip-ring assembly 26 is rigidly connected to the hollow shaft 32 by means of a tapered portion 64 formed on the short spindle 60 which fits in a similarly shaped tapered opening in the hollow shaft 32. The tapered section 64 of the spindle 60 is drawn into tight engagement with the tapered opening in the hollow shaft 32 by means of a nut 48 which threads on to the end of the spindle 60. Thus, opposite ends of the two spindles 60 and 62 are rigidly connected to the hollow shaft 32 and the drive shaft, respectively.

The adjacent ends 70 and 72 of the spindles 60 and 62 are connected together by means of spline teeth 71 and 73 formed on the ends 70 and 72, respectively. The spline teeth 71 and 73 cooperate with the spline teeth 75 formed on the internal surface of a tubular member 74 which bridges the adjacent ends 70 and 72 of the spindles 60 and 62, respectively.

The adjacent ends 70 and 72 are connected together by means of a stud 84 which is tightly threaded into the spindle 62 and loosely threaded in an opening in the spindle 60. Thus, the two spindles 60 and 62 are allowed to move angularly with respect to each other and yet are prevented from moving axially to any great degree.

As shown in Fig. 3, the cooperating splines 71 and 75 are not designed in the conventional manner with close engagement, but are designed to have some angular clearance between them so that there is a loose connection between the spindle 60 and the tubular member 74. The splines 73 and 75 are similarly designed so that there is a loose connection between the spindle 62 and the tubular member 74. The angular clearance between the teeth 71 and 75 need be only half of that previously required in spline connections having a large angular clearance, since the total angular clearance is equal to the sum of the angular clearances between the teeth 73 and 75, and 71 and 75, respectively. This angular clearance is preferably on the order of 7½ degrees, although this value is not critical and may be varied over a reasonable range. Thus, it can be seen that the teeth 71 and 73 formed on the spindles 60 and 62 can be made relatively heavy, thus preventing undue wear due to the impact loading on these teeth. By providing relatively heavy teeth on spindles 60 and 62, most of the wear will be confined to the tubular member 74 which is relatively easy and inexpensive to manufacture, and can be easily replaced if necessary, thus greatly reducing the cost of maintenance of the flexible drive. This invention thus overcomes one of the difficulties of previous flexible drive means employing spline connections having large angular clearances.

In some instances, if there is insufficient damping in the system, it may be found that within a certain narrow frequency range if the amplitude of the applied vibration is suddenly increased by a jolt or roughness of any kind, such as a backfire in the driving engine, the transmitted vibration may show a sudden undesirably large increase due to the unloaded sides of the spline connection engaging each other. This effect will not occur if there is sufficient damping, and for this reason, it is preferable to provide friction damping means in the flexible drive to ensure against the occurrence of this effect in cases where the driven machine may not include sufficient electrical or mechanical damping. This mechanical damping will also reduce the amplitude of the steady state vibration caused by the pulsating torque of an internal combustion engine.

In the embodiment of the invention shown in Figs. 1 and 2, the damping means is provided on the spindle 62 adjacent the splined connection between the adjacent ends of the spindles 60 and 62. The spindle 62 is provided with a second splined portion 100 having spline teeth 101 which engage similar spline teeth 98 formed on the inner surface of a conical-shaped member 96 having a central opening. The outer surface of the conical-shaped member 96 engages a plurality of friction shoes 102, four shoes preferably being used. The shoes 102 may be made of or faced with sintered bronze or other suitable friction material. A compression spring 92, which reacts against one face 94 of the conical member 96 and against a cup-shaped spring washer 82, forces the friction members 102 against a washer 104. The washer 104 is in turn supported from a shoulder 108 formed on the tubular extension 34 of the hollow shaft 32 by means of a spacing ring 106.

It will be seen that the conical member 96 is free to move axially along the spindle 62 and is forced into engagement with the friction members 102 by means of the compression spring 92. Any relative rotational movement between the spindle 62 and hollow shaft 32, therefore, is opposed by the frictional engagement between the friction shoes 102 and the conical member 96 so that the movement is damped and amplification of the vibration is substantially prevented as described above.

It should now be apparent that a flexible drive means has been provided which is very effective in absorbing or reducing torsional vibration and which prevents any substantial amplification of the applied vibration by resonant effects because of the peculiar characteristics of the combination of a torsionally resilient spindle and a spline connection having a large angular clearance. The construction of the flexible drive is relatively simple and inexpensive, and is highly reliable so that its characteristics are well suited for use for aircraft generators, although its usefulness is, of course, not limited to this particular application.

I claim as my invention:

1. In combination, a hollow driven shaft, a first torsionally resilient spindle extending from one end of said shaft partially through said shaft, a second torsionally resilient spindle extending from the end of said first spindle to the other end of said shaft, means for rigidly connecting one end of said first spindle to one end of said shaft, means for effecting a driving connection between adjacent ends of said first and second spindles comprising, spline teeth on adjacent ends of said first and second spindles, a tubular member having internal splines axially positioned so as to bridge the adjacent ends of said first and second spindles and engage the spline teeth on both of said ends, the engaging teeth having relatively large angular clearance therebetween, and means for effecting a driving connection at the other end of said second spindle.

2. In combination, a hollow driven shaft, a first torsionally resilient spindle extending from one end of said shaft partially through said shaft, a second torsionally resilient spindle extending from the end of said first spindle to the other end of said shaft, means for rigidly connecting one end of said first spindle to one end of said shaft, means for effecting a driving connection between adjacent ends of said first and second spindles comprising, spline teeth on adjacent ends of said first and second spindles, a tubular member having internal splines axially positioned so as to bridge the adjacent ends of said first and second spindles and engage the spline teeth on both of said ends, the engaging teeth having relatively large angular clearance therebetween, frictional damping means comprising elements movable with one of said spindles and the shaft respectively, and spring means urging said elements into engagement to oppose relative angular motion between said spindles and said shaft, and means for effecting a driving connection at the other end of said second spindle.

3. In combination, a hollow driven shaft, a first torsionally resilient spindle extending from one end of said shaft partially through said shaft, a second torsionally resilient spindle extending from the end of said first spindle to the other end of said shaft, means for rigidly connecting one end of said first spindle to one end of said shaft, means for effecting a driving connection between adjacent ends of said first and second spindles comprising, spline teeth on adjacent ends of said first and second spindles, a tubular member having internal splines axially positioned so as to bridge the adjacent ends of said first and second spindles and engage the spline teeth on both of said ends, the engaging teeth having relatively large angular clearance therebetween, frictional damping means comprising, a spline section formed on an intermediate section of one of said spindles, a second tubular member having a conical outer surface and internal splines positioned on said spline section, a plurality of friction shoes engaging the conical outer surface of said second tubular member and spring means for urging said second tubular member against said friction shoes to force them outward against the inner surface of said shaft to move with the shaft and to hold them in frictional engagement with the second tubular member to oppose relative angular motion between the spindles and the shaft, and means for effecting a driving connection at the other end of said second spindle.

4. In combination, a hollow driven shaft, a plurality of axially aligned torsionally resilient spindles extending through said shaft, means for rigidly connecting the end of one of said spindles to one end of said shaft, means for effecting a driving connection between adjacent ends of each of said spindles comprising, spline teeth on adjacent ends of each of said spindles and a tubular member having internal splines axially positioned so as to bridge the adjacent ends of two of said spindles, each of said driving connections having relatively large angular clearance between its mating members.

5. In combination, a hollow driven shaft, a plurality of axially aligned torsionally resilient spindles extending through said shaft, means for rigidly connecting the end of one of said spindles to one end of said shaft, means for effecting a driving connection between adjacent ends of each of said spindles comprising, spline teeth on adjacent ends of each of said spindles and a tubular members having internal splines axially positioned so as to bridge the adjacent ends of two of said spindles, each of said driving connections having relatively large angular clearance between its mating members, frictional damping means comprising elements movable with one of said spindles and the shaft respectively, and spring means urging said elements into engagement to oppose relative angular motion between said spindles and said shaft.

6. In combination, a hollow driven shaft, a plurality of axially aligned torsionally resilient spindles extending through said shaft, means for rigidly connecting the end of one of said spindles to one end of said shaft, means for effecting a driving connection between adjacent ends of each of said spindles comprising, spline teeth on adjacent ends of each of said spindles and a tubular member having internal splines axially positioned so as to bridge the adjacent ends of two of said spindles, each of said driving connections having relatively large angular clearance between its mating members, frictional damping means comprising, a spline section formed on an intermediate section of one of said spindles, a tubular member having a conical outer surface and internal splines positioned on said spline section, a plurality of friction shoes engaging the conical outer surface of said tubular member and spring means for urging said tubular member against said friction shoes to force them outward against the shaft to move with the shaft and to hold them in frictional engagement with the tubular member to oppose relative angular motion between the spindles and the shaft.

No references cited.